US011808926B2

(12) United States Patent
Kim

(10) Patent No.: US 11,808,926 B2
(45) Date of Patent: Nov. 7, 2023

(54) OPTICAL IMAGING SYSTEM

(71) Applicant: Samsung Electro-Mechanics Co., Ltd., Suwon-si (KR)

(72) Inventor: Hag Chul Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/518,642

(22) Filed: Nov. 4, 2021

(65) Prior Publication Data

US 2022/0057603 A1 Feb. 24, 2022

Related U.S. Application Data

(63) Continuation of application No. 15/085,036, filed on Mar. 30, 2016, now Pat. No. 11,194,134.

(30) Foreign Application Priority Data

Nov. 26, 2015 (KR) .......................... 10-2015-0166089

(51) Int. Cl.
*G02B 9/60* (2006.01)
*G02B 13/00* (2006.01)
(Continued)

(52) U.S. Cl.
CPC ............ *G02B 13/008* (2013.01); *B60R 11/04* (2013.01); *G02B 5/005* (2013.01); *G02B 9/60* (2013.01);
(Continued)

(58) Field of Classification Search
CPC .... G02B 13/008; G02B 13/02; G02B 13/146; G02B 13/0015; G02B 13/0045;
(Continued)

(56) References Cited

U.S. PATENT DOCUMENTS 4,150,871 A * 4/1979 Tojyo ..................... G02B 21/02
359/659
4,283,123 A 8/1981 Tojyo
(Continued)

FOREIGN PATENT DOCUMENTS

CN 1462893 A 12/2003
CN 1573407 A 2/2005
(Continued)

OTHER PUBLICATIONS

Chinese Office Action dated May 27, 2022, in counterpart Chinese Patent Application No. 202110022860.5 (15 pages in English and 11 pages in Chinese).
(Continued)

*Primary Examiner* — Travis S Fissel
(74) *Attorney, Agent, or Firm* — NSIP Law

(57) ABSTRACT

An optical imaging system includes a first lens, as second lens, a third lens, a fourth lens, and a fifth lens. The first lens includes a positive refractive power and a convex image-side surface. The second lens includes a positive refractive power, and the third lens includes a negative refractive power. The fourth lens includes a positive refractive power, and the fifth lens includes a positive refractive power. The first to fifth lenses are sequentially disposed from an object side toward an imaging plane.

12 Claims, 9 Drawing Sheets

(51) Int. Cl.
  *G02B 13/02* (2006.01)
  *B60R 11/04* (2006.01)
  *G02B 5/00* (2006.01)
  *B60R 11/00* (2006.01)

(52) U.S. Cl.
  CPC .......... *G02B 13/005* (2013.01); *G02B 13/02* (2013.01); *B60R 2011/0033* (2013.01); *B60R 2300/106* (2013.01)

(58) Field of Classification Search
  CPC . G02B 5/005; G02B 9/60; G02B 9/62; G02B 9/64; G02B 15/146; G02B 27/0025; B60R 11/04; B60R 2011/0033; H04N 5/222; H04N 5/2254
  USPC ....... 359/740, 659, 714, 746, 763, 764, 767, 359/769, 756–761, 749, 713, 708, 359/656–657
  See application file for complete search history.

(56) References Cited

U.S. PATENT DOCUMENTS

| | | | |
|---|---|---|---|
| 4,289,385 A * | 9/1981 | Yamagata | G02B 9/60 359/769 |
| 6,295,166 B1 | 9/2001 | Yamamoto | |
| 7,443,610 B1 | 10/2008 | Lin et al. | |
| 7,911,712 B2 | 3/2011 | Kitahara et al. | |
| 8,780,459 B2 | 7/2014 | Chen et al. | |
| 2003/0218808 A1 | 11/2003 | Sekita | |
| 2004/0240080 A1 | 12/2004 | Matsui et al. | |
| 2006/0103947 A1 | 5/2006 | Shinohara et al. | |
| 2010/0103539 A1 | 4/2010 | Kitahara | |
| 2011/0317281 A1 | 12/2011 | Take | |
| 2012/0113524 A1 | 5/2012 | Kasahara et al. | |
| 2012/0154929 A1 | 6/2012 | Tsai et al. | |
| 2013/0021679 A1 | 1/2013 | Tsai et al. | |
| 2013/0208178 A1 | 8/2013 | Park | |
| 2013/0258162 A1 | 10/2013 | Tomioka | |
| 2013/0265650 A1 * | 10/2013 | Chen | G02B 9/60 359/714 |
| 2014/0043695 A1 | 2/2014 | Hsu et al. | |
| 2014/0078603 A1 | 3/2014 | You | |
| 2014/0146405 A1 | 5/2014 | Tsutsumi et al. | |
| 2014/0211328 A1 | 7/2014 | Hashimoto et al. | |
| 2014/0307329 A1 | 10/2014 | Katakura | |
| 2015/0070784 A1 | 3/2015 | Chen et al. | |
| 2015/0185440 A1 | 7/2015 | Chen | |
| 2015/0241660 A1 | 8/2015 | Son | |
| 2015/0277083 A1 | 10/2015 | Chae | |
| 2015/0362702 A1 | 12/2015 | Tang et al. | |
| 2016/0131871 A1 | 5/2016 | Tang et al. | |
| 2016/0282585 A1 | 9/2016 | Shih et al. | |
| 2016/0282588 A1 | 9/2016 | Sekine et al. | |

FOREIGN PATENT DOCUMENTS

| | | |
|---|---|---|
| CN | 102298200 A | 12/2011 |
| CN | 102540423 A | 7/2012 |
| CN | 102967922 A | 3/2013 |
| CN | 103064175 A | 4/2013 |
| CN | 103364924 A | 10/2013 |
| CN | 103777321 A | 5/2014 |
| CN | 104950424 A | 9/2015 |
| CN | 104977698 A | 10/2015 |
| JP | 2006-293042 A | 10/2006 |
| JP | 2011-154318 A | 8/2011 |
| KR | 10-2010-0002623 A | 1/2010 |
| KR | 10-2013-0092846 A | 8/2013 |
| KR | 10-2015-0101677 A | 9/2015 |

OTHER PUBLICATIONS

Notice of Reason for Rejection dated Nov. 22, 2021, in counterpart Korean Patent Application No. 10-2021-0135595 (5 pages in English and 4 pages in Korean).
Korean Office Action dated Aug. 28, 2019 in corresponding Korean Patent Application No. 10-2015-0166089 (10 pages in English, 7 pages in Korean).
Chinese Office Action dated Dec. 25, 2019 in corresponding Chinese Patent Application No. 201610235866.X (16 pages in English, 9 pages in Chinese).
Chinese Office Action dated Apr. 24, 2020 in corresponding Chinese Patent Application No. 201610235866.X (6 pages in English, 5 pages in Chinese).
Korean Office Action dated Jun. 3, 2020 in the related Korean Patent Application No. 10-2020-0062911 (6 pages in English, 4 pages in Korean).
Korean Office Action dated Feb. 26, 2021 in the related Korean Patent Application No. 10-2021-0006745 (5 pages in English) (4 pages in Korean).
Chinese Office Action dated Mar. 17, 2022, in counterpart Chinese Patent Application No. 202110022860.5 (12 pages in English and 9 pages in Chinese).
Korean Office Action dated Jul. 27, 2022, in counterpart Korean Patent Application No. 10-2022-0083557 (7 pages in English and 5 pages in Korean).

* cited by examiner

| FIRST EMBODIMENT ||||||
|---|---|---|---|---|---|
| F number = | 1.88 | FOV = | 53.90 | f = | 6.1000 |
| SURFACE NO. | | RADIUS OF CURVATURE | THICKNESS/ DISTANCE | REFRACTIVE INDEX | ABBE NUMBER |
| S1 | FIRST LENS | −32.2850 | 1.4500 | 1.903 | 31.3 |
| S2 | | −10.4370 | 0.1000 | | |
| S3 | SECOND LENS | 3.5560 | 0.9000 | 1.910 | 35.3 |
| S4 | | 4.1940 | 0.3500 | | |
| S5 | STOP | infinity | 0.6200 | | |
| S6 | THIRD LENS | −3.7180 | 0.3500 | 1.922 | 20.9 |
| S7 | | 13.0050 | 0.2200 | | |
| S8 | FOURTH LENS | −22.1040 | 1.4500 | 1.834 | 42.7 |
| S9 | | −3.7000 | 0.1000 | | |
| S10 | FIFTH LENS | 9.3410 | 1.2100 | 1.834 | 42.7 |
| S11 | | −30.0200 | 0.4500 | | |
| S12 | IMAGING PLANE | infinity | 4.2500 | | |
| S13 | | infinity | 0.0000 | | |

FIG. 3

| SECOND EMBODIMENT | | | | |
|---|---|---|---|---|
| F number = 1.85 | FOV = 55.50 | | f = 6.1000 | |
| SURFACE NO. | RADIUS OF CURVATURE | THICKNESS/ DISTANCE | REFRACTIVE INDEX | ABBE NUMBER |
| S1 | FIRST LENS | -20.3380 | 1.2000 | 1.755 | 52.3 |
| S2 | | -9.8550 | 0.1000 | | |
| S3 | SECOND LENS | 3.9890 | 1.2000 | 1.903 | 31.3 |
| S4 | | 5.1990 | 0.4500 | | |
| S5 | STOP | infinity | 0.5500 | | |
| S6 | THIRD LENS | -3.4570 | 0.2500 | 1.922 | 20.9 |
| S7 | | 16.8810 | 0.2190 | | |
| S8 | FOURTH LENS | -13.1520 | 1.1380 | 1.834 | 42.7 |
| S9 | | -3.3520 | 0.1000 | | |
| S10 | FIFTH LENS | 8.7890 | 1.1690 | 1.834 | 42.7 |
| S11 | | -23.6240 | 4.0340 | | |
| S12 | IMAGING PLANE | infinity | 0.6050 | | |
| S13 | | infinity | 0.0000 | | |

FIG. 6

THIRD EMBODIMENT

F number = 1.87　　FOV = 54.02　　f = 6.2000

| SURFACE NO. | | RADIUS OF CURVATURE | THICKNESS/ DISTANCE | REFRACTIVE INDEX | ABBE NUMBER |
|---|---|---|---|---|---|
| S1 | FIRST LENS | 15.9250 | 0.8520 | 1.755 | 52.3 |
| S2 | | −25.5330 | 0.1000 | | |
| S3 | SECOND LENS | 3.5240 | 1.0720 | 1.903 | 31.3 |
| S4 | | 3.4800 | 0.4500 | | |
| S5 | STOP | infinity | 0.4720 | | |
| S6 | THIRD LENS | −3.5480 | 0.2500 | 1.922 | 20.9 |
| S7 | | 16.2550 | 0.1930 | | |
| S8 | FOURTH LENS | −13.1580 | 1.1320 | 1.834 | 42.7 |
| S9 | | −3.3710 | 0.1000 | | |
| S10 | FIFTH LENS | 7.9940 | 1.2170 | 1.834 | 42.7 |
| S11 | | −24.6690 | 3.6750 | | |
| S12 | | infinity | 0.5920 | | |
| S13 | IMAGING PLANE | infinity | 0.0000 | | |

FIG. 9

OPTICAL IMAGING SYSTEM

CROSS-REFERENCE TO RELATED APPLICATIONS

This application is a continuation of U.S. patent application Ser. No. 15/085,036 filed on Mar. 30, 2016, now U.S. Pat. No. 11,194,134 issued on Dec. 7, 2021, and claims the benefit under 35 USC 119(a) of Korean Patent Application No. 10-2015-0166089 filed on Nov. 26, 2015, in the Korean Intellectual Property Office, the entire disclosures of which are incorporated herein by reference.

BACKGROUND

1. Field

The following description relates to an optical imaging system to photograph an object in both a visible ray region and a near-infrared ray region.

2. Description of Related Art

A monitoring camera is mounted in a vehicle to photograph a front visual field and a rear visual field of the vehicle. For example, the monitoring camera is mounted on a rearview mirror of the vehicle to photograph moving vehicles, pedestrians, and other objects in front of the vehicle.

The monitoring camera performs photographing in during nighttime and daytime. However, because illumination is low at night, it is difficult to clearly photograph an object or a person. Particularly, because the monitoring camera mounted in the vehicle is ideally small, there is a need to mount an optical imaging system capable of photographing the object in both a visible ray region and a near-infrared ray region, while having a small size.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an optical imaging system, including: a first lens including a positive refractive power and a convex image-side surface; a second lens including a positive refractive power; a third lens including a negative refractive power; a fourth lens including a positive refractive power; and a fifth lens including a positive refractive power, wherein the first to fifth lenses are sequentially disposed from an object side toward an imaging plane.

An image-side surface of the second lens may be concave.

An object-side surface of the fourth lens may be concave.

An object-side surface and an image-side surface of the fifth lens are convex.

The optical imaging system may also include a stop disposed between the second lens and the third lens.

one or more of the first to fifth lenses may have a spherical shape.

One or more of the first to fifth lenses may be formed of glass.

$-6.5 < \{(1/f)*(Y/\tan \theta) - 1\}*100 < -1.0$ may be satisfied, in which f is an overall focal length of the optical imaging system, Y is ½ of a diagonal length of the imaging plane, and $\theta$ is a half of a field of view of the optical imaging system.

$TL/2Y < 2.0$ may be satisfied, in which TL is a distance from an object-side surface of the first lens to the imaging plane, and 2Y is a diagonal length of the imaging plane.

$-7.0 < R1/f < 5.0$ may be satisfied, in which f is an overall focal length of the optical imaging system, and R1 is a radius of curvature of an object-side surface of the first lens.

$-5.5 < (R1+R2)/(R1-R2) < 5.5$ may be satisfied, in which R1 is a radius of curvature of an object-side surface of the first lens, and R2 is a radius of curvature of the image-side surface of the first lens.

$0.2 < f/f1 < 0.6$ may be satisfied, in which f is an overall focal length of the optical imaging system, and f1 is a focal length of the first lens.

$-2.5 < f/f3 < -1.5$ may be satisfied, in which f is an overall focal length of the optical imaging system, and f3 is a focal length of the third lens.

$5.0 \leq (t1+t2)/t3 \leq 12.0$ may be satisfied, in which t1 is a thickness of an optical axis center of the first lens, t2 is a thickness of an optical axis center of the second lens, and t3 is a thickness of an optical axis center of the third lens.

$0 \leq |n1-n2| \leq 0.20$ may be satisfied, in which n1 is a refractive index of the first lens, and n2 is a refractive index of the second lens.

In accordance with another embodiment, there is provided an optical imaging system, including: a first lens; a second lens; a third lens including a concave image-side surface and a concave image-side surface; a fourth lens; and a fifth lens of including a convex image-side surface and a convex image-side surface, wherein the first to fifth lenses are sequentially disposed from an object side toward an imaging plane.

In accordance with a further embodiment, there is provided an optical imaging system, including: a first lens; a second lens including a convex object-side surface, a third lens including a convex object-side surface and a concave image-side surface; and a fifth lens including a concave object-side surface, wherein the second and third lenses include a refractive index greater than a refractive index of the first lens, and the fourth and the fifth lenses include a refractive index less than a refractive index of the third lens.

A first lens may include a positive refractive power, a second lens may include a positive refractive power, a third lens may include a negative refractive power, a fourth lens may include a positive refractive power, and a fifth lens may include a positive refractive power.

An Abbe number of the third lens may be lower than an Abbe number of the first lens.

An Abbe number of the fourth lens and the fifth lens may be greater than an Abbe number of the third lens.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which:

FIG. 3 is a table representing characteristics of lenses of the optical imaging system illustrated in FIG. 1;

FIG. 6 is a table representing characteristics of lenses of the optical imaging system illustrated in FIG. 4;

FIG. 9 is a table representing characteristics of lenses of the optical imaging system illustrated in FIG. 7.

Figure 1:
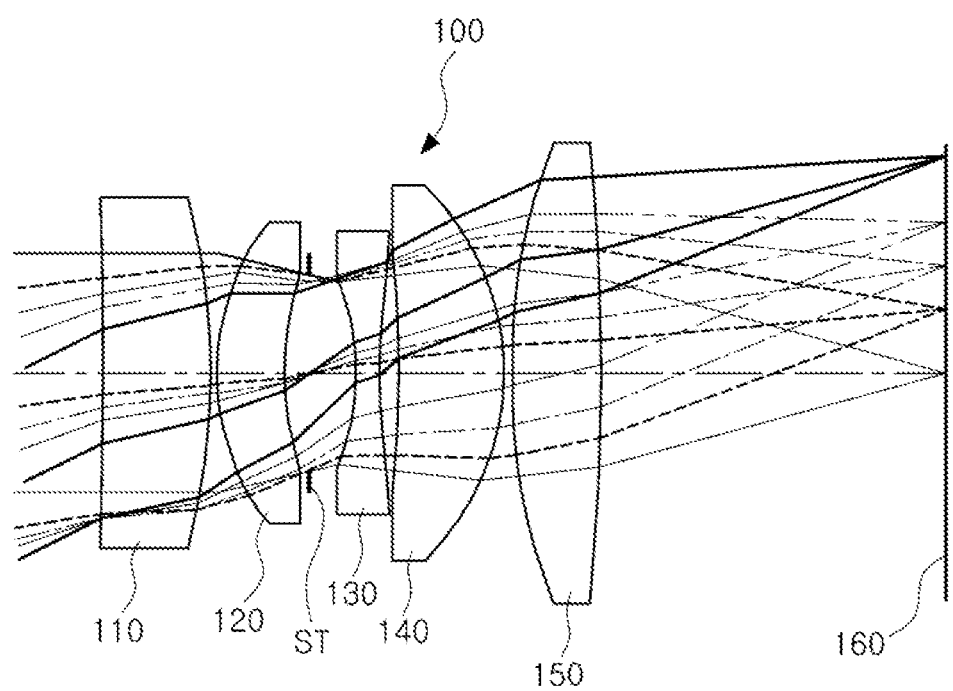
FIG. 1 is a view of an optical imaging system, according to a first embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be understood that, although the terms first, second, third, etc. may be used herein to describe various lenses, these lenses should not be limited by these terms. These terms are only used to distinguish one lens from another lens. These terms do not necessarily imply a specific order or arrangement of the lenses. Thus, a first lens discussed below could be termed a second lens without departing from the teachings description of the various embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, various embodiments will be described with reference to schematic views illustrating embodiments. In the drawings, for example, due to manufacturing techniques and/or tolerances, modifications of the shape shown may be estimated. Thus, embodiments should not be construed as being limited to the particular shapes of regions shown herein, for example, to include a change in shape results in manufacturing. The following embodiments may also include one or a combination thereof.

In addition, in accordance with an embodiment, a first lens is a lens closest to an object or a subject for which an image is captured. A fifth lens is a lens closest to an imaging plane or an image sensor. In addition, all of radii of curvature and thicknesses of lenses, a TL, a Y (½ of a diagonal length of the imaging plane), and focal lengths are represented by millimeters (mm). Further, thicknesses of the lenses, gaps between the lenses, and the TL are distances measured in relation to optical axes of the lenses.

A person skilled in the relevant art will appreciate that other units of measurement may be used. Further, in the present specification, all radii of curvature, thicknesses, optical axis distances from the first surface of the first lens to the image sensor (OALs), distances on the optical axis between the stop and the image sensor (SLs), image heights (IMG HTs), back focus lengths (BFLs) an overall focal length of an optical system, and a focal length of each lens are indicated in millimeters (mm). Further, thicknesses of lenses, gaps between the lenses, OALs, and SLs are distances measured based on an optical axis of the lenses.

In addition, concerning shapes of lenses, such shapes are represented in relation to optical axes of the lenses. A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat.

An optical imaging system includes an optical system including a plurality of lenses. For example, the optical system of the optical imaging system includes five lenses having refractive power. The lens module may include from four lenses up to five lenses without departing from the scope of the embodiments herein described. In accordance with an illustrative example, the embodiments described of the optical system include five lenses with a refractive power. However, a person of ordinary skill in the relevant art will appreciate that the number of lenses in the optical system may vary, for example, between two to five lenses, while achieving the various results and benefits described hereinbelow. Also, although each lens is described with a particular refractive power, a different refractive power for at least one of the lenses may be used to achieve the intended result.

Further, the optical imaging system is not limited to including only the lenses having refractive power. For example, the optical imaging system may include a stop to control an amount of light. Further, the optical imaging system may further include an image sensor (that is, an imaging device) converting an image of a subject incident thereto through the optical system into electrical signals. Further, the optical imaging system may further include a gap maintaining member adjusting a gap between lenses.

First to fifth lenses may be formed of materials having a refractive index different from that of air. For example, the first to fifth lenses may be formed of plastic or glass or a polyurethane material.

An optical imaging system may include five lenses, an image sensor, and a stop. Next, the above-mentioned components will be described.

The first lens has a refractive power. For example, the first lens has a positive refractive power.

One surface of the first lens is convex. For example, an image-side surface of the first lens is convex.

The first lens has a spherical surface. For example, both surfaces of the first lens are spherical. The first lens is formed of a material having a high light transmissivity and excellent workability. For example, the first lens is formed of glass. However, a material of the first lens is not limited to glass. For example, the first lens is formed of plastic or a polyurethane material.

The first lens has a predetermined refractive index. For example, a refractive index of the first lens is 1.70 or more.

The second lens has a refractive power. For example, the second lens has a positive refractive power.

One surface of the second lens is concave. For example, an image-side surface of the second lens is concave.

The second lens has a spherical surface. For example, both surfaces of the second lens are spherical. The second lens is formed of a material having high light transmissivity and excellent workability. For example, the second lens is formed of glass. However, a material of the second lens is not limited to glass. For example, the second lens may also be formed of plastic or a polyurethane material.

The second lens has a refractive index higher than that of the first lens. For example, a refractive index of the second lens is 1.90 or more.

The third lens has a refractive power. For example, the third lens has a negative refractive power.

At least one surface of the third lens is concave. For example, both surfaces of the third lens are concave. In one example, the object-side surface of the third lens is concave in a paraxial region and gradually flattens at edge portions thereof. In another example, the image-side surface of the third lens is concave in a paraxial region.

The third lens has a spherical surface. For example, both surfaces of the third lens are spherical. The third lens is formed of a material having high light transmissivity and excellent workability. For example, the third lens is formed of glass. However, a material of the third lens is not limited to glass. For example, the third lens is formed of plastic or a polyurethane material.

The third lens has a refractive index higher than the refractive index of the first lens. For example, a refractive index of the third lens is 1.90 or more. The third lens has an Abbe number lower than an Abbe number of the first lens. For example, an Abbe number of the third lens is 25 or less.

The fourth lens has a refractive power. For example, the fourth lens has a positive refractive power.

One surface of the fourth lens is concave. For example, an object-side surface of the fourth lens is concave.

The fourth lens has a spherical surface. For example, both surfaces of the fourth lens is spherical. The fourth lens is formed of a material having high light transmissivity and excellent workability. For example, the fourth lens is formed of glass. However, a material of the fourth lens is not limited to glass. For example, the fourth lens may be formed of plastic or a polyurethane material.

The fourth lens has a refractive index lower than that of the third lens. For example, a refractive index of the fourth lens is less than 1.90. The fourth lens has an Abbe number higher than an Abbe number of the third lens. For example, an Abbe number of the fourth lens is 40 or more.

The fifth lens has a refractive power. For example, the fifth lens has a positive refractive power.

At least one surface of the fifth lens is convex. For example, both surfaces of the fifth lens are convex.

The fifth lens has a spherical surface. For example, both surfaces of the fifth lens is spherical. The fifth lens is formed of a material having high light transmissivity and excellent workability. For example, the fifth lens is formed of glass. However, a material of the fifth lens is not limited to glass. For example, the fifth lens may be formed of plastic or a polyurethane material.

The fifth lens has a refractive index lower than a refractive index of the third lens. For example, a refractive index of the fifth lens is less than 1.90. The fifth lens may have an Abbe number higher than an Abbe number of the third lens. For example, an Abbe number of the fifth lens is 40 or more.

A person of ordinary skill in the relevant art will appreciate that each of the first through fifth lenses may be configured in an opposite refractive power from the configuration described above. For example, in an alternative configuration, the first lens has a negative refractive power, the second lens has a negative refractive power, the third lens has a positive refractive power, the fourth lens has a negative refractive power, and the fifth lens has a negative refractive power.

The image sensor is configured to realize a high resolution. For example, a unit size of pixels configuring the image sensor may be 1.12 µm or less. An imaging plane on which an image is formed is formed on a surface of the image sensor.

The stop is disposed between lenses. For example, the stop is disposed between the second and third lenses. The stop disposed as described above may adjust an amount of light incident to the image sensor.

The optical imaging system satisfies the following Conditional Expressions 1 through 9:

$-6.5 < \{(1/f)*(Y/\tan\theta)-1\}*100 < -1.0$   [Conditional Expression 1]

$TL/2Y < 2.0$   [Conditional Expression 2]

$-7.0 < R1/f < 5.0$   [Conditional Expression 3]

$-5.5 < (R1+R2)/(R1-R2) < 5.5$   [Conditional Expression 4]

$0.2 < f/f1 < 0.6$   [Conditional Expression 5]

$-2.5 < f/f3 < -1.5$   [Conditional Expression 6]

$1.5 < f/EPD < 2.1$   [Conditional Expression 7]

$5.0 < (t1+t2)/t3 < 12.0$   [Conditional Expression 8]

$0 \le |n1-n2| \le 0.2$.   [Conditional Expression 9]

In an example, f is an overall focal length of the optical imaging system, 2Y is a diagonal length of the imaging plane, Y is ½ of 2Y, θ is a half of a field of view of the optical imaging system, R1 is a radius of curvature of an object-side surface of the first lens, R2 is a radius of curvature of the image-side surface of the first lens, f1 is a focal length of the first lens, f3 is a focal length of the third lens, EPD is an entrance pupil diameter (EPD), t1 is a thickness of an optical axis center of the first lens, t2 is a thickness of an optical axis center of the second lens, t3 is a thickness of an optical axis center of the third lens, n1 is a refractive index of the first lens, and n2 is a refractive index of the second lens.

The optical imaging system satisfying the above Conditional Expressions 1 through 9 may be miniaturized, and may realize a high resolution.

Further, optical imaging systems, according to several embodiments, will be described.

First, an optical imaging system, according to a first embodiment, will be described with reference to FIG. 1.

The optical imaging system 100, according to the first embodiment, includes a plurality of lenses having refractive power. For example, the optical imaging system 100 includes a first lens 110, a second lens 120, a third lens 130, a fourth lens 140, and a fifth lens 150.

In an embodiment, the first lens 110 has a positive refractive power, and an object-side surface thereof is concave and an image-side surface thereof is convex. The second lens 120 has a positive refractive power, and an object-side surface thereof is convex and an image-side surface thereof is concave. The third lens 130 has a negative refractive power, and both surfaces thereof are concave. The fourth lens 140 has a positive refractive power, and an object-side surface thereof is concave and an image-side surface thereof is convex. The fifth lens 150 has a positive refractive power, and both surfaces thereof are convex. A stop ST is disposed between the second lens and the third lens.

The optical imaging system 100 includes a component forming an imaging plane. For example, the optical imaging system includes an image sensor 160.

Figure 2:
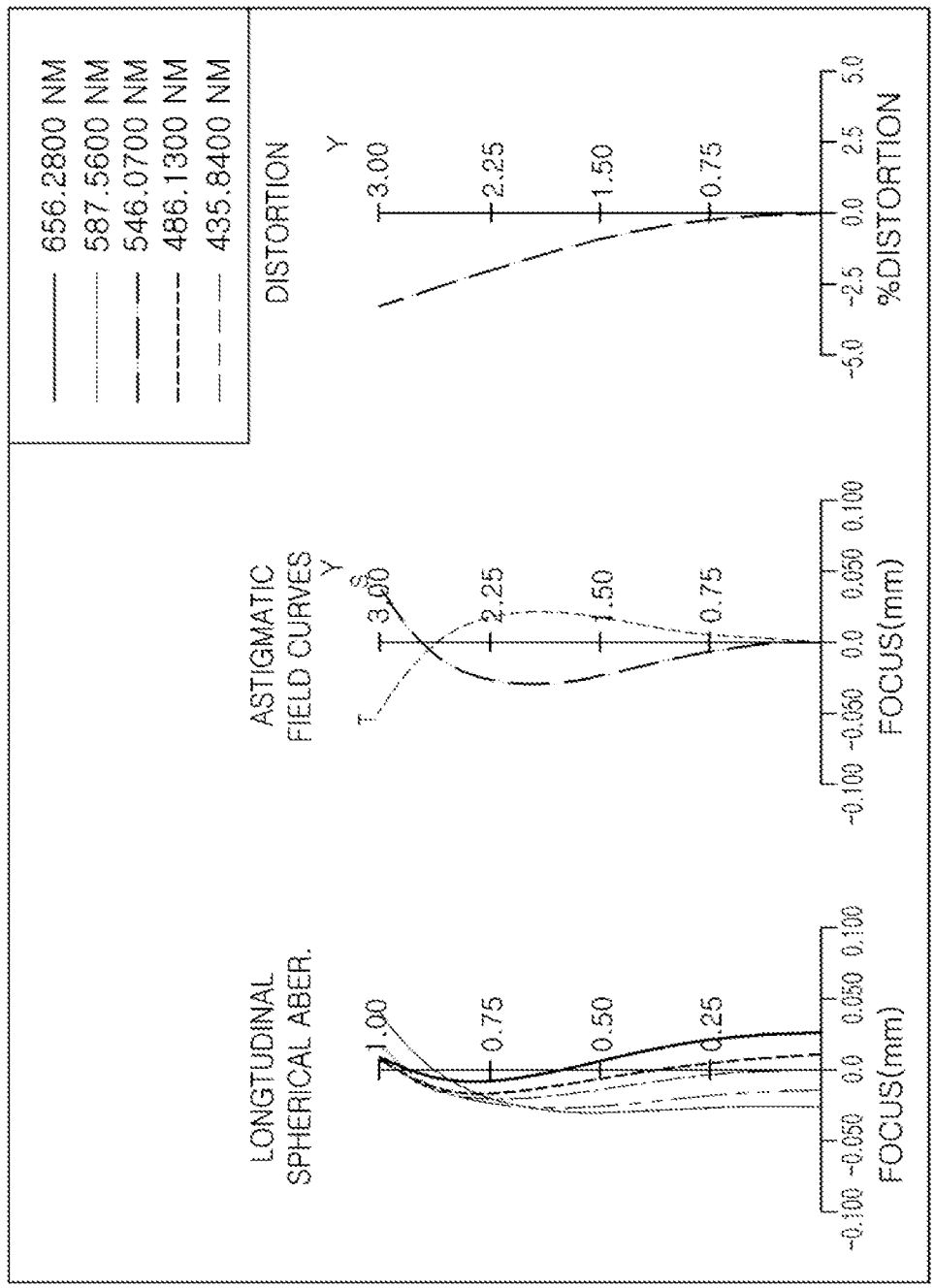
FIG. 2 is a graph representing aberration curves of the optical imaging system illustrated in FIG. 1.

The optical imaging system, configured as described above, may represent aberration characteristics illustrated in FIG. 2. FIG. 3 is a table representing characteristics of lenses of the optical imaging system, according to the first embodiment.

Figure 4:
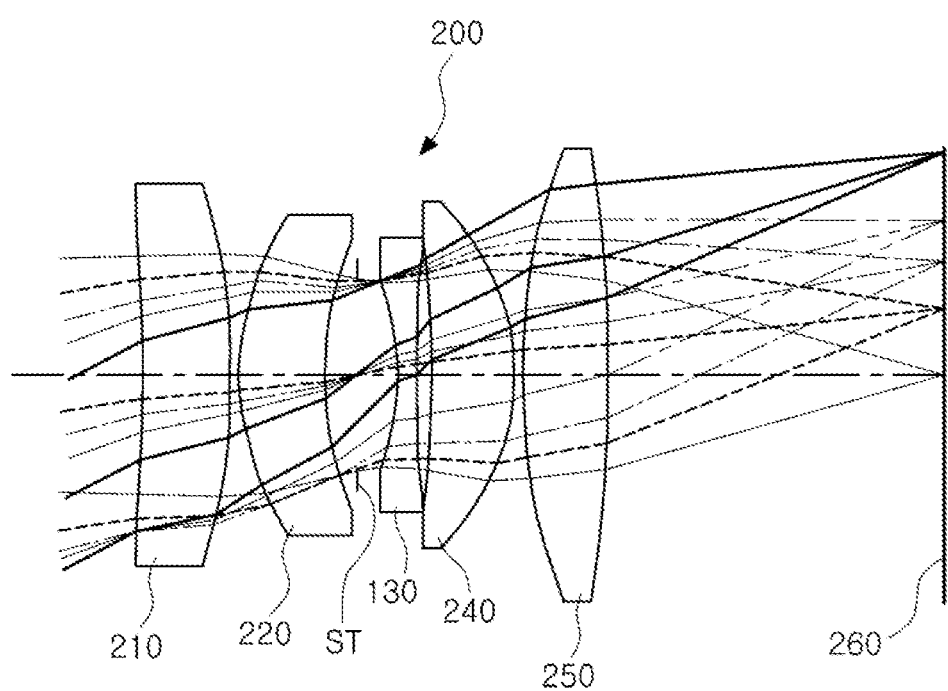
FIG. 4 is a view of an optical imaging system, according to a second embodiment.

An optical imaging system, according to a second embodiment, will be described with reference to FIG. 4.

The optical imaging system 200, according to the second embodiment, includes a plurality of lenses having refractive power. For example, the optical imaging system 200 includes a first lens 210, a second lens 220, a third lens 230, a fourth lens 240, and a fifth lens 250.

In an embodiment, the first lens 210 has a positive refractive power, and an object-side surface thereof is concave and an image-side surface thereof is convex. The second lens 220 has a positive refractive power, and an object-side surface thereof is convex and an image-side surface thereof is concave. The third lens 230 has a negative refractive power, and both surfaces thereof are concave. The fourth lens 240 has a positive refractive power, and an object-side surface thereof is concave and an image-side surface thereof is convex. The fifth lens 250 has a positive refractive power, and both surfaces thereof is convex. A stop ST is disposed between the second lens and the third lens.

The optical imaging system 200 includes a component forming an imaging plane. For example, the optical imaging system includes an image sensor 260.

Figure 5:
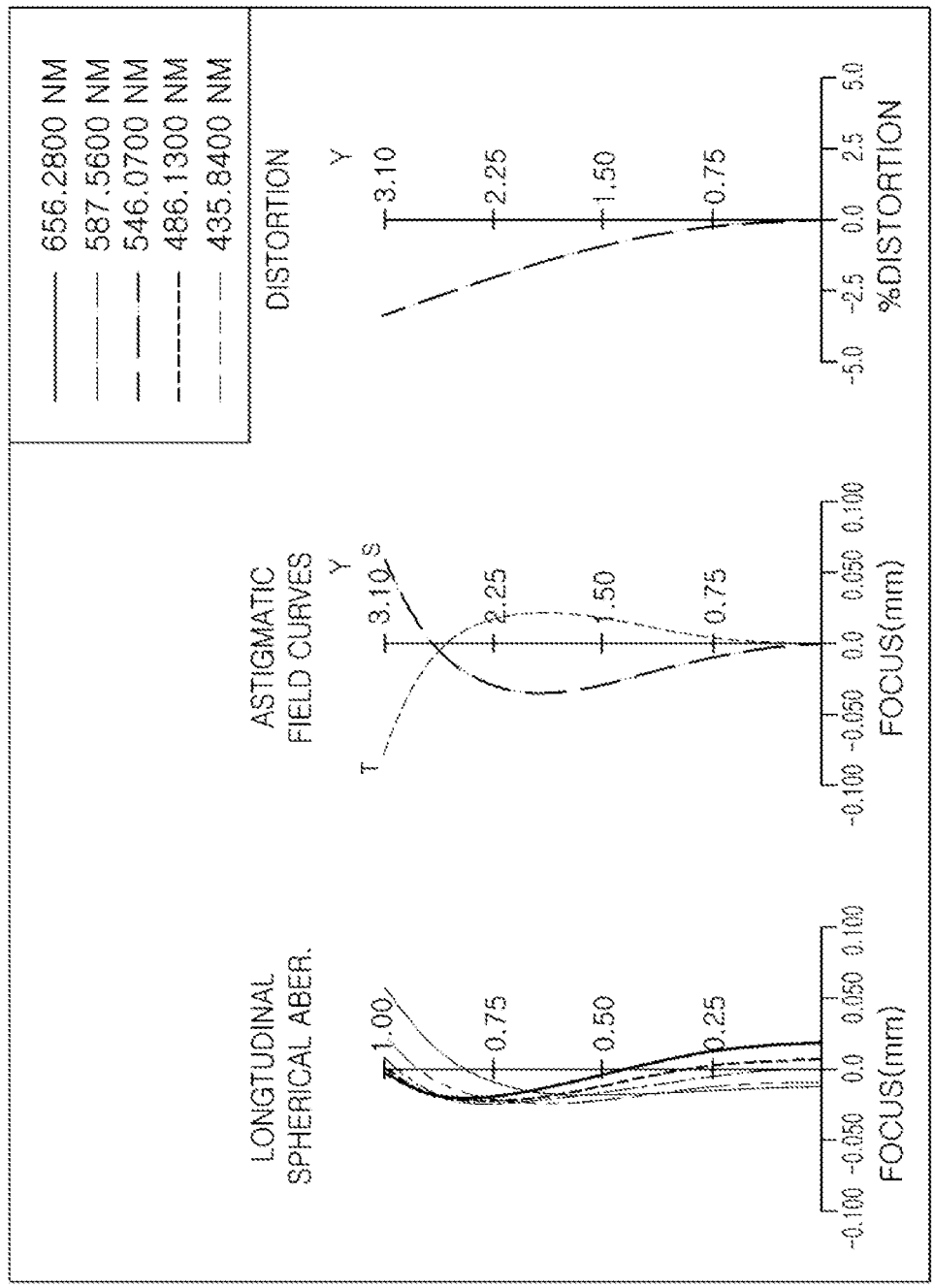
FIG. 5 is a graph representing aberration curves of the optical imaging system illustrated in FIG. 4.

The optical imaging system, configured as described above, represents aberration characteristics illustrated in FIG. 5. FIG. 6 is a table representing characteristics of lenses of the optical imaging system, according to the second embodiment.

Figure 7:
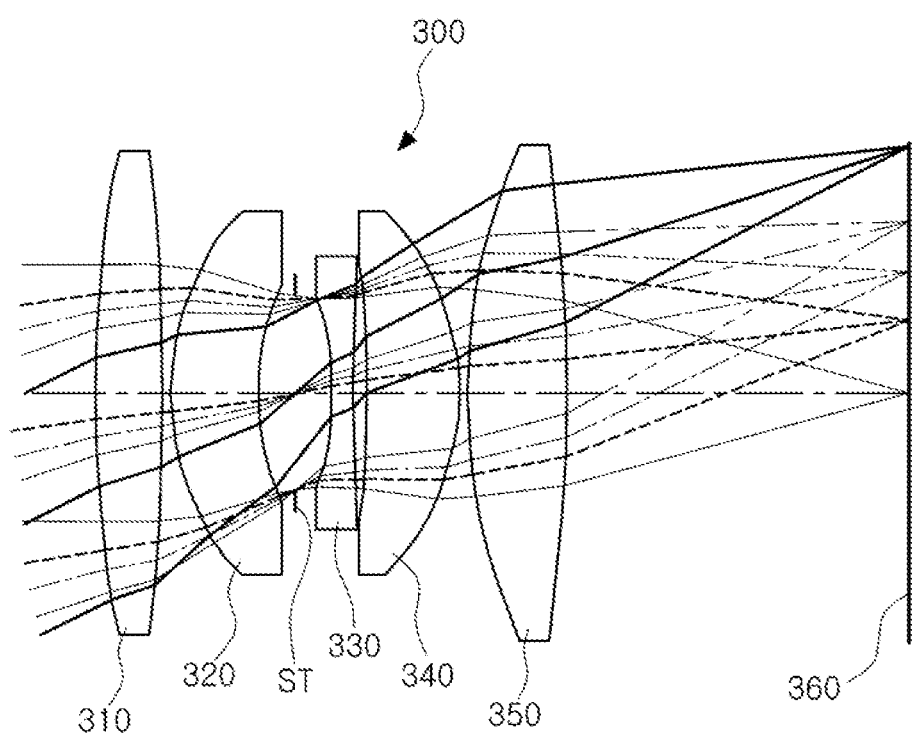
FIG. 7 is a view of an optical imaging system, according to a third embodiment.

An optical imaging system, according to a third embodiment, will be described with reference to FIG. 7.

The optical imaging system 300, according to the third embodiment, includes a plurality of lenses having refractive power. For example, the optical imaging system 300 includes a first lens 310, a second lens 320, a third lens 330, a fourth lens 340, and a fifth lens 350.

In an embodiment, the first lens 310 has a positive refractive power, and both surfaces thereof are convex. The second lens 320 has a positive refractive power, and an object-side surface thereof is convex and an image-side surface thereof is concave. The third lens 330 has a negative refractive power, and both surfaces thereof are concave. The fourth lens 340 has a positive refractive power, and an object-side surface thereof is concave and an image-side surface thereof is convex. The fifth lens 350 has a positive refractive power, and both surfaces thereof are convex. A stop ST is disposed between the second lens and the third lens.

The optical imaging system 300 includes a component forming an imaging plane. For example, the optical imaging system includes an image sensor 360.

Figure 8:
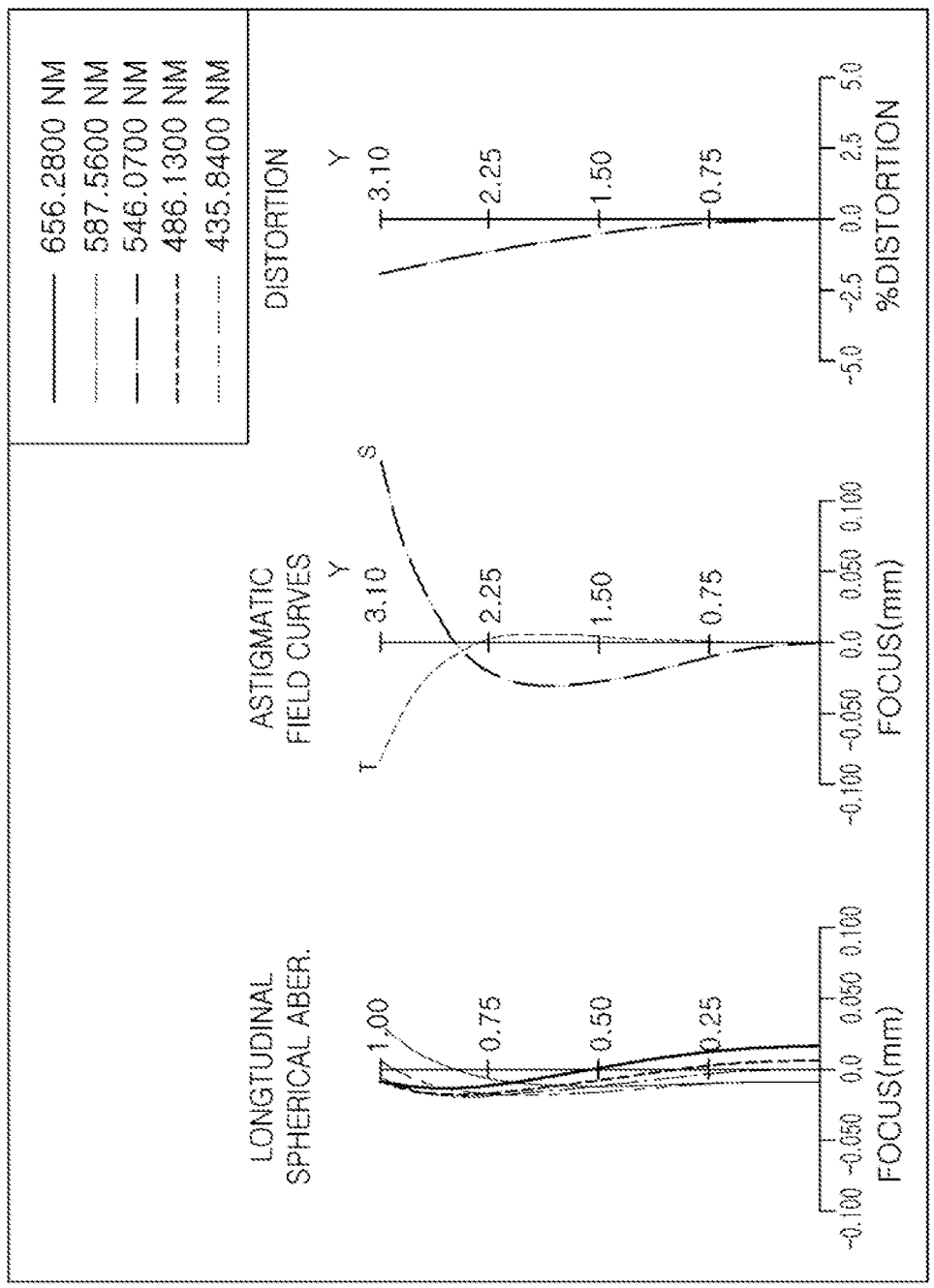
FIG. 8 is graphs representing aberration curves of the optical imaging system illustrated in FIG. 7.

The optical imaging system, configured as described above, represents aberration characteristics illustrated in FIG. 8. FIG. 9 is a table representing characteristics of lenses of the optical imaging system, according to the third embodiment.

Table 1 represents optical characteristics of the optical imaging systems, according to the first to third embodiments. An overall focal length (f) of the optical imaging system is determined to be in a range of 5.9 to 6.4. In the optical imaging system, a focal length (f1) of the first lens is determined to be in a range of 12.0 to 26.0. In the optical imaging system, a focal length (f2) of the second lens is determined to be in a range of 11.0 to 31.0. In the optical imaging system, a focal length (f3) of the third lens is determined to be in a range of −3.3 to −2.0. In the optical imaging system, a focal length (f4) of the fourth lens is determined to be in a range of 5.0 to 6.0. In the optical imaging system, a focal length (f5) of the fifth lens is determined to be in a range of 6.0 to 10.0. In the optical imaging system, TL is determined to be in a range of 9.0 to 12.0. An F number of the optical imaging system is 1.9 or less. In the optical imaging system, an EPD is determined to be in a range of 3.2 to 3.4. An overall field of view (2θ) of the optical imaging system is determined to be in a range of 52 to 57.

TABLE 1

| Remarks | First Embodiment | Second Embodiment | Third Embodiment |
|---|---|---|---|
| f | 6.10000 | 6.10000 | 6.20000 |
| f1 | 16.5581 | 24.1354 | 13.1064 |
| f2 | 15.3627 | 12.9068 | 29.2263 |
| f3 | −3.10482 | −3.09389 | −3.13969 |
| f4 | 5.14407 | 5.12337 | 5.16263 |
| f5 | 8.66335 | 7.80889 | 7.36402 |
| TL | 11.4500 | 11.0150 | 10.1050 |
| F number | 1.88000 | 1.85000 | 1.87000 |
| EPD | 3.24400 | 3.29700 | 3.31500 |
| 2θ | 53.9000 | 55.5000 | 54.0200 |
| Y | 3.00000 | 3.10000 | 3.10000 |

Table 2 represents values of Conditional Expressions of the optical imaging systems, according to the first to third embodiments. The optical imaging systems, according to the first to third embodiments, satisfy all of the numerical ranges of the above Conditional Expressions as seen in Table 2.

TABLE 2

| Conditional Expression | First Embodiment | Second Embodiment | Third Embodiment |
|---|---|---|---|
| ((1/f)*(Y/tanθ) − 1)*100 | −3.26958 | −3.40769 | −1.91180 |
| TL/2Y | 1.90833 | 1.77661 | 1.62984 |
| R1/f | −5.29262 | −3.33410 | 2.56855 |
| (R1 + R2)/(R1 − R2) | 1.95542 | 2.88019 | −0.23175 |
| f/f1 | 0.36840 | 0.25274 | 0.47305 |
| f/f3 | −1.96469 | −1.97163 | −1.97472 |
| f/EPD | 1.88039 | 1.85017 | 1.87029 |
| (t1 + t2)/t3 | 6.71429 | 9.60000 | 7.69600 |
| |n1 − n2| | 0.01900 | 0.16700 | 0.16700 |

Because the optical imaging system, configured as described above, has the F number of 1.9 or less, an object is clearly photographed in a visible ray region and a near-infrared ray region and in a low illumination environment. In addition, because spherical lenses are used in the optical imaging system, according to an embodiment, a cost required to manufacture the optical imaging system is reduced. In addition, the optical imaging system, according to an embodiment, secures predetermined resolution in a temperature range of −40° C. to 80° C. Therefore, the optical imaging system, according to an embodiment, realizes high resolution even in an environment in which a temperature change is large, such as the interior of a vehicle.

As set forth above, the optical imaging systems, according to embodiments, clearly photograph an object even in a low illumination environment.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens having a positive refractive power;
   a second lens having a positive refractive power and a concave image-side surface in a paraxial region thereof;
   a third lens having a negative refractive power and a concave object-side surface in a paraxial region thereof;
   a fourth lens having a positive refractive power; and
   a fifth lens having a refractive power,
   wherein the first to fifth lenses are sequentially disposed in ascending numerical order along an optical axis of the optical imaging system from an object side of the optical imaging system toward an imaging plane of the optical imaging system,
   the optical imaging system has a total number of five lenses having a refractive power,
   TL/2Y<2.0 is satisfied, where TL is a distance along the optical axis from an object-side surface of the first lens to the imaging plane, and 2Y is a diagonal length of the imaging plane, and
   a radius of curvature of an object-side surface of the fourth lens is greater than a radius of curvature of the object-side surface of the first lens.

2. The optical imaging system of claim 1, wherein the second lens has a convex object-side surface in a paraxial region thereof.

3. The optical imaging system of claim 1, wherein the third lens has a concave image-side surface in a paraxial region thereof.

4. The optical imaging system of claim 1, wherein the fourth lens has a convex image-side surface in a paraxial region thereof.

5. The optical imaging system of claim 1, wherein the fifth lens has a convex object-side surface in a paraxial region thereof.

6. The optical imaging system of claim 1, wherein an Abbe number of the third lens is less than an Abbe number of the first lens.

7. The optical imaging system of claim 1, wherein an Abbe number of the fourth lens and an Abbe number of the fifth lens are each greater than an Abbe number of the third lens.

8. The optical imaging system of claim 1, wherein a refractive index of the second lens and a refractive index of the third lens are each greater than a refractive index of the first lens.

9. The optical imaging system of claim 1, wherein a refractive index of the fourth lens and a refractive index of the fifth lens are each less than a refractive index of the third lens.

10. An optical imaging system comprising:
    a first lens having a positive refractive power;
    a second lens having a positive refractive power and a concave image-side surface in a paraxial region thereof;

a third lens having a negative refractive power and a concave object-side surface in a paraxial region thereof;

a fourth lens having a positive refractive power; and a fifth lens having a refractive power, wherein the first to fifth lenses are sequentially disposed in ascending numerical order along an optical axis of the optical imaging system from an object side of the optical imaging system toward an imaging plane of the optical imaging system, the optical imaging system has a total number of five lenses having a refractive power, TL/2Y<2.0 is satisfied, where TL is a distance along the optical axis from an object-side surface of the first lens to the imaging plane, and 2Y is a diagonal length of the imaging plane, and −7.0<R1/f<5.0 is satisfied, where f is an overall focal length of the optical imaging system, and R1 is a radius of curvature of the object-side surface of the first lens.

11. The optical imaging system of claim 1, wherein −5.5<(R1+R2)/(R1−R2)<5.5 is satisfied, where R1 is a radius of curvature of the object-side surface of the first lens, and R2 is a radius of curvature of the image-side surface of the first lens.

12. The optical imaging system of claim 1, wherein 0≤|n1−n2|≤0.20 is satisfied, where n1 is a refractive index of the first lens, and n2 is a refractive index of the second lens.

* * * * *